(12) United States Patent
Brendel et al.

(10) Patent No.: US 12,698,401 B2
(45) Date of Patent: Aug. 4, 2026

(54) COATED METAL EFFECT PIGMENTS, METHOD OF PRODUCTION AND USE THEREOF

(71) Applicant: ECKART GmbH, Hartenstein (DE)

(72) Inventors: Carolin Brendel, Nuremberg (DE); Oliver Bedford, Eckental (DE); Oliver Struck, Hartenstein (DE); Simone Kreppner, Schnaittach (DE); Stefan Trummer, Nuremberg (DE); Andrea Fetz, Lauf a.d. Pegnitz (DE)

(73) Assignee: ECKART GmbH, Hartenstein (DE)

( * ) Notice: Subject to any disclaimer, the term of this patent is extended or adjusted under 35 U.S.C. 154(b) by 278 days.

(21) Appl. No.: 18/285,588

(22) PCT Filed: Jun. 13, 2022

(86) PCT No.: PCT/EP2022/066026
§ 371 (c)(1),
(2) Date: Oct. 4, 2023

(87) PCT Pub. No.: WO2022/263375
PCT Pub. Date: Dec. 22, 2022

(65) Prior Publication Data
US 2024/0228788 A1    Jul. 11, 2024
US 2025/0236736 A2    Jul. 24, 2025

(30) Foreign Application Priority Data

Jun. 14, 2021    (EP) ..................................... 21179176

(51) Int. Cl.
*C09C 1/64*        (2006.01)
*C09D 5/36*        (2006.01)

(52) U.S. Cl.
CPC ................ *C09C 1/648* (2013.01); *C09D 5/36* (2013.01); *C01P 2002/86* (2013.01); *C01P 2004/20* (2013.01)

(58) Field of Classification Search
CPC ......... C09C 1/648; C09C 1/644; C09C 1/642; C09D 5/36; C01P 2002/86; C01P 2004/20
See application file for complete search history.

(56) References Cited

U.S. PATENT DOCUMENTS 5,472,491 A  *  12/1995  Duschek .................. C09D 5/36
                                                                                            106/439
8,088,211 B2     1/2012  Hashizume
(Continued)

FOREIGN PATENT DOCUMENTS

CN        1678697        10/2005
EP        1613702        1/2006
(Continued)

OTHER PUBLICATIONS

International Search Report and Written Opinion for International Application No. PCT/EP2022/066026 dated Sep. 21, 2022.
(Continued)

*Primary Examiner* — Pegah Parvini

(57) ABSTRACT

This invention involves a coated flaky metal effect pigment comprising a metal effect flake as substrate coated by the following consecutive coating sequences: a) optionally a discontinuous or a continuous layer of Mo-oxide, b1) an inorganic metal oxide layer comprising mainly $SiO_2$, c1) a hybrid layer comprising $SiO_2$ modified by a diphenyl silane, a phenylsilane or mixtures thereof or c2) a hybrid layer comprising $SiO_2$ modified by a diphenyl silane, a phenylsilane or mixtures thereof, b2) an inorganic metal oxide layer
(Continued)

Alupigment 100 1 D:\Data\Topspin_Daten\mar300 site1: σ(iso) = -43.0 ppm
half width = 370 Hz; integral = 1.0

$D^2$-moiety $(O_2SiPh_2)$
9.4% site2: σ(iso) = -90.7 ppm
half width = 205 Hz; integral = 0.1

$Q^2$-moiety $(O_2Si(OH)_2)$
1.0% site3: σ(iso) = -100.89 ppm
half width = 446 Hz; integral = 3.4

$Q^3$-moiety $(O_3Si(OH))$
32.1% site4: σ(iso) = -110.1 ppm
half width = 491 Hz; integral = 6.1

$Q^4$-moiety $(O_4Si)$
57.5%

NMR 300
7mm probe
5.0 kHz

[rel]
80
60
40
20
0

-20    -40    -60    -80    -100    -120    -140    [ppm]

comprising mainly $SiO_2$, and d) optionally a further top-coat of organofunctional silanes, titanates, aluminates or zirconates.

10 Claims, 1 Drawing Sheet

(56) References Cited

U.S. PATENT DOCUMENTS

| | | | |
|---|---|---|---|
| 9,624,378 B2 | 4/2017 | Hippmann | |
| 10,557,037 B2 | 2/2020 | Kreppner | |
| 2006/0053968 A1 | 3/2006 | Schuster et al. | |
| 2018/0021240 A1 | 1/2018 | Stein-Hofmann | |

FOREIGN PATENT DOCUMENTS

| | | | | |
|---|---|---|---|---|
| EP | 1619222 | 1/2006 | | |
| EP | 1621586 | 2/2006 | | |
| EP | 2510060 | 10/2012 | | |
| JP | 2008-127416 | * 6/2008 | ............... | C09C 1/64 |
| WO | 2004087816 | 10/2004 | | |
| WO | 2007001795 | 1/2007 | | |
| WO | 2007017195 | 2/2007 | | |
| WO | 2007043453 | 4/2007 | | |
| WO | 2008077612 | 7/2008 | | |
| WO | 2015013762 | 2/2015 | | |
| WO | 2015086771 | 6/2015 | | |
| WO | 2016120015 | 8/2016 | | |

OTHER PUBLICATIONS

P. Pihui et al., "Improved Performance of Aluminum Pigments Encapsulated in Hybrid Inorganic-Organic Films," Particuology, vol. 19, pp. 93-98, Apr. 1, 2015.

* cited by examiner

Alupigment 100 1 D:\Data\Topspin_Daten\mar300
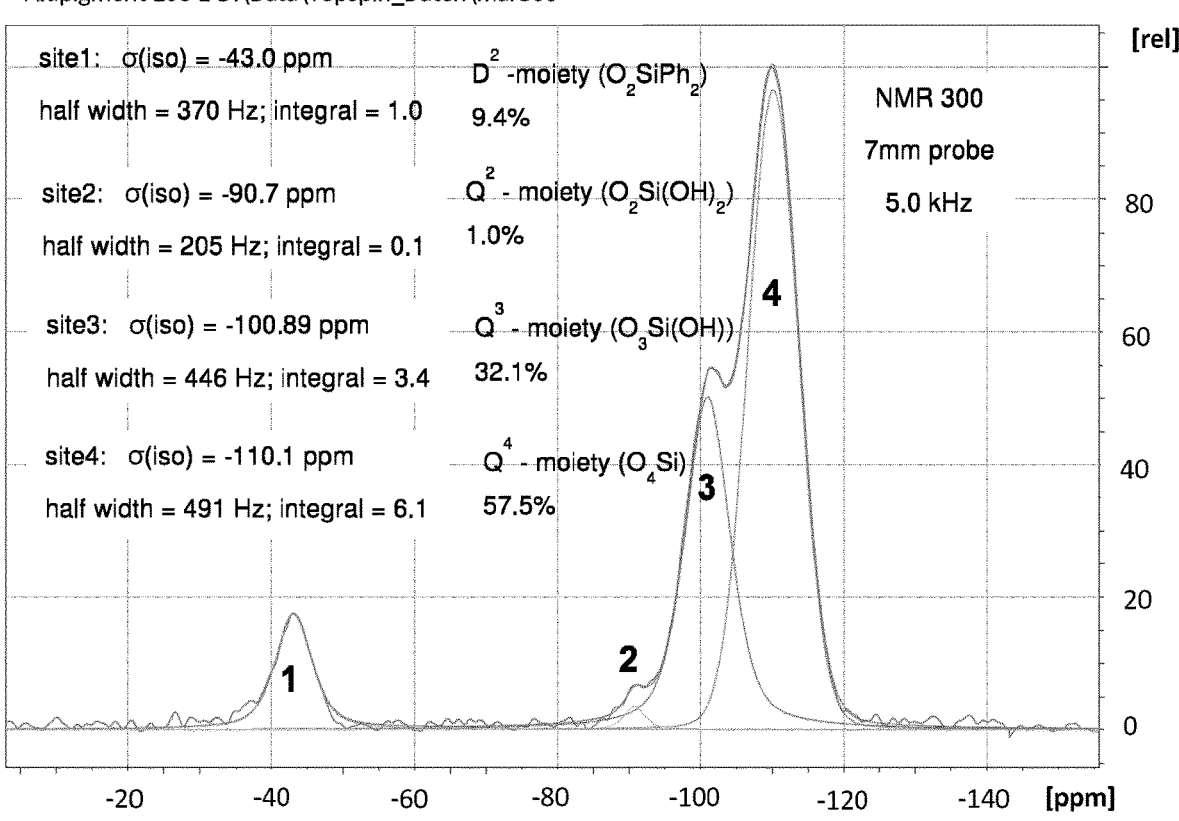

COATED METAL EFFECT PIGMENTS, METHOD OF PRODUCTION AND USE THEREOF

The present invention relates to coated metal effect pigments suitable for waterborne coating formulations.

Metal effect pigments and especially aluminium effect pigments are sensitive to corrosion. Especially when using them in waterborne coatings formulations the pigments can react with water under evolution of hydrogen. Therefore, they must be passivated before used therein. For non-aggressive water-based formulations a stabilization with additives such as typically phosphonic acids or phosphoric acid esters may be well enough and are well known.

Silica coated metal effect pigments are presently the most accepted products of metal effect pigments used in more aggressive water-based coating formulation in automotive or industrial coatings. Products are commercially available under the trade name Hydrolan® (Eckart GmbH) or Emeral® (Toyo Aluminium Kasei), for example. Such kind of passivated metal effect pigments presently represent the "gold standard" of gassing stable aluminium pigments.

In such passivated metal effect pigments a dense silica coating enables a passivation layer for gassing stability and the silica surface is further modified by suitable organic groups to enable compatibility to organic binder systems and therefore render the pigments stable to cross-cut tests (according to DIN EN ISO 2409) after a water condensation-constant atmospheres testing (according to DIN EN ISO 50 017). Such tests represent standard testing methods of pigments for all exterior applications, especially automotive industry. The silica layer is formed by sol-gel synthesis.

EP 1619222 A1 disclosed a further increase of the gassing stability by introducing a first layer of molybdenum oxide prior to the silica coating.

The silica layer as such may be sensitive to the impact of mechanical forces. WO 2007/017195 A2 disclosed a hybrid inorganic/organic layer which can withstand mechanical forces which, for example, occur in the treatment of the coated metal effect pigments in a mixer during large scale-production.

A further increase of the gassing stability as measured by a more enhanced gassing test in the presence of iron oxide of such hybrid layer stabilization was disclosed in WO 2016/120015 A1. Here, also hybrid inorganic/organic layers were employed wherein a silica network was modified by organic oligomers or polymers which are connected with the silica via network forms.

Customer demands are presently still increasing with respect to gassing stability in very aggressive gassing tests and also increased mechanical impact as expressed by an enhanced Waring-Blender test. Such tests are accepted in the art as a laboratory test to simulate shear force impacts of automotive circulation lines to the flaky effect pigments. Therefore, it is an object of the present invention to provide coated metal effect pigments which can pass these further intensified tests.

Particularly, it is an object of the present invention that coated flaky metal effect pigments need to have optical properties after a treatment described in the experimental section and called as enhanced "Waring-blender" test, wherein compared to the unsheared metal effect pigment the $\Delta L^*$-value is preferably $\leq 2.60$ and more preferably $\Delta L^* \leq 2.20$ at any of the measured angles of observation of 15°, 25°, 45°, 75° and 110°.

A further object of the present invention is to provide a method of manufacturing such metal effect pigments.

The object of the invention was solved by providing a coated flaky metal effect pigment comprising a metal effect flake as substrate coated by the following consecutive coating sequences:

a) optionally a discontinuous or a continuous layer of Mo-oxide, b1) an inorganic metal oxide layer comprising mainly $SiO_2$, c1) a hybrid layer comprising $SiO_2$ modified by a diphenyl silane, a phenyl silane or mixtures thereof, or c2) a hybrid layer comprising $SiO_2$ modified by a diphenyl silane, a phenyl silane or mixtures thereof, b2) an inorganic metal oxide layer comprising mainly $SiO_2$, and d) optionally a further top-coat of organofunctional silanes, titanates, aluminates or zirconates.

Further preferred embodiments of this coated flaky metal pigment are described in the claims.

The object was further solved by providing a method of manufacture these flaky coated metal pigments comprising the following steps:

a) optionally coating the metallic substrate with a discontinuous or a continuous layer of Mo-oxide b1) coating the metallic substrate or the substrate obtained from step a) with an inorganic metal oxide layer mainly comprising $SiO_2$ in a sol-gel process, preferably using TEOS as precursor material, c1) forming a hybrid layer on layer b1) by sol-gel reaction of a tetraalkoxy silane of formula $$Si(OR)_4 \tag{I}$$

with a diphenylsilane of formula $$Ph_2Si(OR')_2, \tag{IIa}$$

a phenylsilane of formula $$PhSi(OR')_3 \tag{IIb}$$

or mixtures thereof wherein R is methyl, ethyl, n-propyl or isopropyl, n-butyl or iso-butyl and R' independently is methyl or ethyl, or c2) coating the metallic substrate or the substrate obtained from step a) with a hybrid layer by sol-gel reaction of a tetraalkoxy silane of formula $$Si(OR)_4 \tag{I}$$

with a diphenyl silane of formula $$Ph_2Si(OR')_2, \tag{IIa}$$

a phenylsilane of formula $$PhSi(OR')_3 \quad \text{(IIb)}$$

or mixtures thereof b2) coating the coated substrate c2) with an inorganic metal oxide layer mainly comprising $SiO_2$ in a sol-gel process, preferably using TEOS as precursor material, and d) optionally coating the effect pigment obtained from c1) or b2) with an organofunctional silane, titanate, aluminate or zirconate.

Further preferred embodiments of this method of manufacturing the coated flaky metal pigment are described in the claims.

Finally, the object of the invention is solved by use of the coated metallic effect pigments of this invention in coatings, especially aqueous based coatings, printing inks, plastics or powder coatings.

DESCRIPTION

Coated Flaky Metal Effect Pigment:

The coated flaky metal effect pigment of this invention comprises a metal effect flake as substrate coated by the following consecutive coating sequences:

a) optionally a discontinuous or a continuous layer of Mo-oxide, b1) an inorganic metal oxide layer comprising mainly $SiO_2$, c1) a hybrid layer comprising $SiO_2$ modified by a diphenyl silane, a phenyl silane or mixtures thereof, or c2) a hybrid layer comprising $SiO_2$ modified by a diphenyl silane, a phenyl silane or mixtures thereof, b2) an inorganic metal oxide layer comprising mainly $SiO_2$, and d) optionally a further top coat of organofunctional silanes, titanates, aluminates or zirconates.

When within this invention the inorganic metal oxide layer comprising mainly $SiO_2$ l b1) or b2) or both of them are meant it is referred to generally as layer b).

When either the hybrid layers c1) or c2) or both of them are meant it is referred to generally as layer c).

The flaky metal effect pigment substrates are preferably selected from aluminum, copper, zinc, zinc alloys, iron, chromium, titanium, zirconium, tin or mixtures or alloys thereof. Preferred alloys are gold-bronze or steel.

More preferred are aluminum, copper and gold-bronze and most preferred aluminum or aluminum alloys. Aluminum effect pigments are by far the most widespread effect pigments in the coating industry representing silver metal color tones in various realizations.

In certain embodiments the flaky metal effect pigment substrates, especially aluminum substrates may be produced by PVD (physical vapor deposition) means. These metal effect pigments represent by far the most brilliant pigments available. However, they are presently rarely used in automotive basecoat due to severe application problems. Furthermore, although their prices have decreased during the last decade they represent the most expensive metal effect pigments, especially aluminum effect pigments. Therefore, it is preferred to use flaky metal effect pigments, preferably aluminum effect pigments which were produced by milling technology. The milling technology is well known and especially a Hall process (wet milling) is preferred. The aluminum effect pigments can be of the "silverdollar" or of the "cornflake" type. Furthermore, the aluminum effect pigments may be very thin milled pigments with average thicknesses comparable to PVD pigments as described e.g. in EP 1621586 B1, WO 2004087816 A2 or WO 2008/077612 A2.

The flaky metal effect pigment substrates have a $D_{50}$-value in a range of 2 to 100 μm, more preferably in a range of 5 to 60 μm, and most preferably in a range of 7 to 40 μm. The $D_{50}$ is the median value of the particle size distribution function. It indicates the size that is equal or smaller than 50% of the particles. These measurements are conducted e.g. by means of laser granulometry using a particle size analyzer manufactured by Sympatec GmbH (model: Helos/BR). The measurement is conducted according to data from the manufacturer. The particles measured with this method are calculated according to the Fraunhofer approximation as volume averaged equivalent spheres.

The thickness can be characterized by the median value $h_{50}$ and is in a range of 15 to 600 nm, preferably in a range of 50 to 400 nm and more preferably in a range of 80 to 300 nm. Especially for aluminum pigments obtained by milling technology the $h_{50}$-value is preferably in a range of 40 to 600 nm and more preferably in a range of 50 to 300 nm.

The thickness distribution and therefore the $h_{50}$-value can be determined by AFM (atomic force microscopy) or preferably by SEM as described in EP 1613702 B1 (paragraphs [0124] to [0128]).

The flaky metal effect pigment substrates are called "flaky", when their aspect ratio, defined as $D_{50}/h_{50}$ is larger than 5. Preferably the metal effect pigments have aspect ratios in the range of 10 to 1,000, more preferably in the range of 20 to 150 and most preferably in the range of 25 to 100.

The optional layer (a) from molybdenum oxide can be either a discontinuous layer or a continuous layer of metal oxide.

The term "continuous layer (a)" means that layer (a) encapsulates substantially completely, in particular completely, the respective metal substrate. The term "discontinuous layer (a)" means that layer (a) only partially encapsulates the respective metal substrate. A partial encapsulation means that the respective metal substrate is not fully coated. The partial encapsulation or discontinuity can be realized, e.g., in the form of islands of layer (a) on the respective metal substrate.

According to an embodiment of the invention, the layer (a) comprises or consists of metal oxide wherein said metal oxide is selected from the group consisting of molybdenum oxide, molybdenum hydroxide, molybdenum oxide hydrate, molybdenum peroxides and mixtures thereof. The molybdenum oxide usually is a mixture of different species and may involve coordination type species. It may be represented by the compositional formulas:

$$MoO_3mH_2O{\cdot}nH_2O \quad \text{or} \quad MoO_{3-m}(O_2)_m{\cdot}nH_2O \quad \text{(III)}$$

wherein Mo is molybdenum, O is oxygen, $0 \leq m \leq 2$ and $1 \leq n < 2$.

Also molybdenum complexes involving different ligands selected from the group of water, $O_2$, O and mixtures thereof may be included. All these species are included in the term "Mo-oxide" within this invention.

Furthermore, layer (a) may also contain elemental molybdenum in an amount of 0 to 30 atom-%, preferably 0 to 25 atom-% and most preferably 3 to 20 atom-%, each based on the total content of the molybdenum forming the metal oxide (a).

The amount of elemental molybdenum may be determined with XPS.

Preferably, the molybdenum oxide coat is prepared by first preparing a solution of polymolybdic acid peroxide by dissolving molybdenum oxide or elemental molybdenum in a hydrogen oxide solution (see for example Solid States Ionics, pp. 507-512, 1992).

It is of utmost importance in this invention that the metal pigments are coated by individual layers of an inorganic metal oxide layer comprising mainly $SiO_2$ only and of a hybrid layer, wherein $SiO_2$ is modified by diphenyl silane, a phenyl silane or mixtures thereof. Very surprisingly such coated metal effect pigments had an enhanced gassing stability in a very strong gassing test even after strong mechanical treatment (Waring Blender test). The diphenyl silane or phenyl silane is a so-called network modifier which means that it is able to bond covalently to the silica via hydrolyzed SiOH (silanol) groups, but is does not form an organic network. The phenyl groups mainly impart hydrophobic properties to the silica network.

With "$SiO_2$" it is meant in this invention that it includes silica formed typically in a sol-gel process. The silica can contain water and can contain residual amounts of non-hydrolyzed alkoxy-groups.

The silica is preferably formed by a well-known sol-gel process which consists of a hydrolysis and a condensation step form silicon alkoxides:

$$\text{hydrolysis: } Si(OR)_4 + H_2O \longrightarrow HO\text{---}Si(OR)_3 + \tag{IV}$$

$$ROH \longrightarrow \longrightarrow \longrightarrow \text{"}Si(OH)_4\text{"}$$

$$\text{condensation: "}Si(OH)_4\text{"} \longrightarrow SiO_2 + 2H_2O \tag{V}$$

The species "$Si(OH)_4$" does not exist in solution but is used to illustrate that up to four hydrolysis steps are needed to finally obtain $SiO_2$. R is preferably methyl, ethyl, n-propyl or isopropyl, n-butyl or iso-butyl, more preferably methyl or ethyl and most preferably ethyl.

The reaction in catalyzed by bases or acids. In EP 2510060 A1 it is disclosed that the catalysis can be conducted by a base and an acid catalyzed step.

Residues of such catalysator can also remain in the silica, especially of basic catalysts as the silica itself is acidic due to its silanol groups.

The inorganic metal oxide layer comprising mainly $SiO_2$ (layer b) contains $SiO_2$ in an amount in a range of more than 50 to 100 wt.-%, based on this layer b). Preferably the amount of $SiO_2$ is in a range of 75 to 100 wt.-%, more preferably in a range of 85 to 100 wt.-% and most preferably in a range of 90 to 100 wt.-%, each based on layer b). Other metal oxides may be present in this layer such as $ZrO_2$, $TiO_2$, $Al_2O_3$, Ce-oxide, $SnO_2$ or the like. In another embodiment layer b) consists of $SiO_2$.

Without being bound to a theory the inventors assume that the single inorganic metal oxide layer b) containing mainly $SiO_2$ layer imparts a certain mechanical stability to the metal effect pigment. In preferred embodiments this stability is achieved when the silica layer has a certain minimal thickness. It is therefore preferred when the mean thickness of the layer b) is at least 15 nm. Below 15 nm mean thickness the mechanical stability is not achieved. On the other side should the silica not exceed certain thicknesses as otherwise the optical properties of the metal effect pigments may be distorted. It is therefore preferred that the silica layer b) has preferably a mean thickness in a range of 15-40 nm, more preferably in a range of 16 to 30 nm and most preferably in a range of 17 to 25 nm.

The two different layers and their thickness' can be best determined via TEM (transmission electron microscope) analysis of a cross-section of the coated metal effect pigments. The coated effect pigments are embedded in a hard lacquer such as a cured epoxy binder. From this cross-section ultra-thin lamellas can be prepared by using an ultra-microtome. The lamellas can be collected in water and be mounted on TEM grids. Using the TEM and possibly additionally EDX the thickness of the layers can be determined. For determination of the mean thickness of the layers at least 10 pigment particles should be counted.

Without being bond to a theory the inventors assume that the hybrid layer is mainly enhancing the gassing stability of the coated metal effect pigment.

The incorporation of the diphenyl silane or the phenyl silane or mixtures thereof into the silica layer c) can be preferably formed by using a dialkoxy diphenyl silane or a trialkoxy phenyl silane. A reaction step leading to modified silica can be, for example, achieved via a transesterification step:

$$SiO(OR)\text{---}OH + Si(OR')_2Ph_2 \longrightarrow \tag{VIa}$$

$$SiO(OR')\text{---}O\text{---}SiO(OR') + R'\text{---}OH$$

or a condensation step of the pre-hydrolyzed diphenyl silane:

$$SiO(OR)\text{---}OH + Si(OH)(OR')_2Ph_2 \longrightarrow \tag{VIb}$$

$$SiO(OR')\text{---}O\text{---}SiO(OR')Ph_2 + H_2O$$

R' is independently of R methyl or ethyl. It is well known that organofunctional silanes modified by Si—C bonds are less reactive in a sol-gel reaction than tetra alkoxy silanes. To balance this disadvantage, it is therefore preferred that diphenyl silane in the hybrid layer c) is formed by diphenyl dimethoxy silane, as the leaving methoxy group is known to be the most reactive group.

As outlined before both layers $SiO_2$ b) and the hybrid layer $SiO_2$ layer c) are needed in the total coating of the metal effect pigments. However, it is preferred to use the following variant of consecutive layers:

a) optionally a discontinuous or a continuous layer of Mo-oxide, b1) a metal oxide layer comprising mainly $SiO_2$, preferably an amount of $SiO_2$ in a range of 75 to 100 wt.-%, referred to layer b), c1) a hybrid layer comprising $SiO_2$ modified by a diphenyl silane, a phenyl silane or mixtures thereof, d) optionally a further top-coat of organofunctional silanes, titanates, aluminates or zirconates.

This variant turned out to be most stable and reproducible. Preferably a diphenyl silane is used as network modifying agent.

In the case of the second variant:

a) optionally a discontinuous or a continuous layer of Mo-oxide, c2) a hybrid layer comprising $SiO_2$ μmodified by a diphenyl silane, a phenyl silane or mixtures thereof, b2) a metal oxide layer comprising mainly $SiO_2$, preferably an amount of $SiO_2$ in a range of 75 to 100 wt.-%, referred to layer b), d) optionally a further top-coat of organofunctional silanes, titanates, aluminates or zirconates, it is preferred that the coatings c2) and b2) are coated in a two-pot synthesis by isolation of the coated substrate after step c2) from the reaction mixture and redispersing in a solvent before conducting coating step b2) and the optional step d).

The amount especially of the diphenyl silane in the coating referred to the total Si-amount can be measured by solid state NMR-MAS (nuclear magnetic resonance-magic angle spinning) spectroscopy. Namely $^{29}Si$ NMR-MAS is a suitable tool, as it is well known that from the chemical shift of Si-atoms it is possible to distinguish between various Si species:

Q-silanes represent species where Si atoms are bound to oxygen atoms only. Namely one can distinguish the following species: $Q^2$: $O_2Si(OH)_2$; $Q^3$: $O_3Si(OH)$ and $Q^4$: $(O_4Si)$. The abbreviation "Q" denotes to the sum of all these species. The Q-silanes therefore represent the "$SiO_2$" amount of the total coating and their chemical shift can be observed in the $^{29}Si$ spectra in a range of about −120 to −87 ppm.

D-silanes represent species wherein two carbon atoms a bound to the silicon atom, which is in case of a diphenyl silane, for example, $D^2$: $O_2SiPh_2$. These species have a chemical shift in a range of about −45 to −40 ppm.

In the present invention the integral $^{29}Si$ NMR-MAS signal ratio of D-silanes to Q-silanes is in case of the diphenyl silane preferably in a range of 1.5% to 10.5%, more preferably in a range of 1.8 to 10.0% and most preferably in a range of 2.0 to 7.0%.

Within these ranges the optimal ratio of diphenyl silane to silica had been found with respect to the desired properties. Therefore, surprisingly a relative low amount of diphenyl silane with respect to the total silica amount is needed for optimized properties.

For embodiments in which the optional further top-coat d) is made from of organofunctional silanes typically silanes are used which have only one Si—C bond. These species are denoted as T-species in NMR terminology and have chemical shift of about −70 to −60 ppm.

In preferred embodiments of using diphenyl silanes as network modifier such species are used for the top-coating and the $^{29}Si$ NMR-MAS signal ratio of T-silanes to Q-silanes is in a range of 0 to 3.0% and more preferred in a range of 0.5-2.5%.

These rather low relative amounts of T-silanes are due to the fact, that these silanes are usually used as top-coat modification agents and thus they are coated not within the hybrid layer b) but just on the top of the pigment surface.

In FIG. 1 a $^{29}Si$-NMR-MAS spectrum is shown for an inventive example together with fitted curves of the signals and the quantitative analysis of the peaks.

For embodiments using phenyl silane as network modifier the $^{29}Si$ NMR-MAS signal ratio of T-silanes to Q-silanes is in a range of 3.5% to 13.5%, more preferably in a range of 4.0 to 13.0% and most preferably in a range of 5.0 to 10.0%.

Surprisingly, it was estimated that the hybrid layer b) does not need to contain any oligomerized or polymerized organic material as it was described in WO 2007/01795 A1 or WO 2016/120015 A1. The mere modification of a $SiO_2$ layer by diphenyl silane in combination with the two separate layers b) and c) seems to be enough to impart the desired stability to the coated metal pigments. Therefore, in preferred embodiments the coated metal effect pigments do not contain organic oligomers and/or polymers liked via a network former with the $SiO_2$ layer.

The chemical nature of the organic parts of the coating can be further analyzed by $^{13}C$ NMR-MAS spectroscopy. In further embodiments the coated metal effect pigments exhibit, when characterized by this method, $^{13}C$-NMR-MAS signals attributable to diphenyl moieties of the D-silanes or phenyl moieties of the T-silanes and optionally $^{13}C$-NMR-MAS signals attributable to organic moieties connected with further T-silanes. It is preferred that the total amount of these $^{13}C$-NMR signals is in a range of 80% to 100%, more preferably in a range of 90% to 100% and most preferably in a range of 95% to 100% of all $^{13}C$-signals observed. Diphenyl silanes typically form peaks in the $^{13}C$-NMR-MAS spectrum in the range of 125 to 140 ppm with two maxima at about 128 ppm and 134 ppm which are well known for phenyl groups.

Typical moieties of T silanes depend on the specific functionalities of these silanes but can be well attributed by the skilled artesian.

In further preferred embodiments only the $^{13}C$-NMR-MAS signals attributable to diphenyl moieties of the D-silanes or phenyl moieties of T-silanes are in a range of 60 to 100% and more preferably in a range of 70 to 100% and most preferably in a range of 75 to 95% of all $^{13}C$-signals observed in the NMR-MAS spectrum.

The amount of organic material of effect pigments can also be roughly quantified by the carbon content of the whole effect pigment after pyrolysis. In preferred embodiments the content of carbon is in a range of 1.3 to 7.5 wt.-%; more preferred in a range of 2.0 to 5.0 wt.-%, each referred to the total weight of the coated metal effect pigment.

In further preferred embodiments the flaky metal effect pigments according to this invention have a total amount of the sum of $SiO_2$ and of diphenyl silane in layers b) and c) of at least 90 wt.-% 93 wt.-%, more preferred at least 95 wt.-%, 96 wt.-%, 97 wt.-%, each based on the amount of the total coating.

In further preferred embodiments the total coating containing layers a), b), c) and d) of the flaky metal effect pigment has an average thickness in a range of 30 to 60 nm, more preferred in a range of 35 to 50 nm and most preferred in a range of 30 to 45 nm. Thus, although at least two coatings are needed the total thickness of the coatings is rather low.

Above a total thickness of 60 nm the optical properties of the flaky metal effect pigments like gloss and flip-flop are generally getting unacceptable, especially when compared with pure silica coated metal effect pigments. Below of a total thickness of 30 nm the gassing stability and the mechanical stability is too low.

For the optional topcoat organofunctional silanes, titanates, aluminates or zirconates are used. This topcoat modifies the chemical nature and polarity of the effect pigment surface and ensures compatibility to the final coating binder system with respect to adhesion. Most preferred are organofunctional silanes. These organofunctional silanes may have organic moieties like amino, hydroxy, thiol, (meth) acrylate, vinyl, epoxy, isocyanate, urethane, which are capable to chemically interact or to form chemical bonds to corresponding functional groups of binders. But the organofunctional silanes can have also hydrophobic groups to impart a certain controlled hydrophobicity of the pigments surface.

Preferably the topcoat comprises organofunctional silanes with amino groups and alkyl or aryl groups. Examples for amino silanes are:

aminopropyl trimethoxy silane (Dynasylan AMMO), aminopropyl triethoxy silane (Dynasylan AMEO) or N-(2-aminoethyl)-3-aminopropyl trimethoxy silane (Dynasylan DAMO), N-(2-aminoethyl)-3-aminopropyl triethoxy silane (Dynasylan DAMEO), N-ethylgamma-aminoisobutyl trimethoxy silane (Silquest A-Link 15), 4-amino-3,3-dimethylbutyltrimethoxysilane (Silquest Y-11637), N-cyclohexyl aminomethyl methyldiethoxy silane (GENIOSIL XL 924), (N-cyclohexylaminomethyl) triethoxysilane (GENIOSIL XL 926), (N-phenylaminomethyl) trimethoxysilane (GENIOSIL XL 973) and mixtures thereof.

In other preferred embodiments pre-condensated organofunctional silanes (hetero polysiloxanes) are used as described in WO 2015/086771 A1. Examples for such pre-condensated organofunctional silanes are, for example, commercially available as Dynasylan® Hydrosil® 2627, Dynasylan® Hydrosil® 2776 Dynasylan® Hydrosil® 2909, Dynasylan 1146 und Dynasylan® Hydrosil® 2907 from Evonik Industries AG, 45128 Essen, Germany. Preferred are water-based pre-condensated organofunctional silanes such as Dynasylan® Hydrosil® 2627, Dynasylan® Hydrosil® 2776, Dynasylan® Hydrosil® 2907 and Dynasylan® Hydrosil® 2909.

In other embodiments a further top-coat d) is not necessary. It is assumed that in this case some phenyl groups from the diphenyl silane are located on the top of the surface of the coated flaky effect pigment and thus render the surface chemistry and surface properties of the effect pigment in a favorable way.

A very preferred embodiment of this invention is a coated flaky metal effect pigment comprising an aluminum effect pigment obtained by milling as substrate which is coated by the following consecutive coating sequences:

a) optionally a discontinuous or a continuous layer of Mo-oxide, b1) a metal oxide layer comprising mainly $SiO_2$, preferably a layer consisting of $SiO_2$, c1) a hybrid layer comprising $SiO_2$ μmodified by a diphenyl silane, wherein the D/Q-ratio as determined by $^{29}$Si-NMR-MAS spectroscopy is in a range of 2.0 to 7.0 and d) optionally a further top-coat of organofunctional silanes, titanates, aluminates or zirconates.

Manufacture of Flaky Coated Metal Effect Pigment:

A further embodiment of this invention is a method of manufacture of the coated flaky metal effect pigment comprising the following steps:

a) optionally coating the metallic substrate with a discontinuous or a continuous layer of Mo-oxide b) coating the metallic substrate or the substrate obtained from step a) with an inorganic metal oxide layer mainly comprising $SiO_2$ in a sol-gel process, preferably using TEOS as precursor material, c) forming a hybrid layer by sol-gel reaction of a tetra alkoxy silane of formula $$Si(OR)_4 \qquad (I)$$

with a diphenyl silane of formula $$Ph_2Si(OR')_2, \qquad (IIa)$$

a phenylsilane of formula $$PhSi(OR')_3 \qquad (IIb)$$

or mixtures thereof wherein R and R' independently is methyl or ethyl, or c2) coating the metallic substrate or the substrate obtained from step a) with a hybrid layer by sol-gel reaction of a tetraalkoxy silane of formula $$Si(OR)_4 \qquad (I)$$

with a diphenyl silane of formula $$Ph_2Si(OR')_2, \qquad (Ial)$$

a phenylsilane of formula $$PhSi(OR')_3 \qquad (IIb)$$

or mixtures thereof b2) coating the coated substrate c2) with an inorganic metal oxide layer mainly comprising $SiO_2$ in a sol-gel process, preferably using TEOS as precursor material, and d) optionally coating the effect pigment obtained from c1) or b2) with an organofunctional silane, titanate, aluminate or zirconate.

In preferred embodiments for step c) the tetra alkoxy silane is tetra ethoxy silane (TEOS) and the diphenyl silane is diphenyl dimethoxy silane.

The reaction is catalyzed by bases or acids. It can be also catalyzed by a combination of acids or bases in separate steps as outlined in EP 2510060 A1.

Preferably the sol-gel reaction is catalyzed by bases. Preferably, the basic catalyst is an organic base and more preferably an amine or ammonia. These may be primary, secondary or tertiary amines.

In a further preferred embodiment, the amine has 1 to 8, particularly preferably 1 to 6 and very particularly preferably 1 to 5 C atoms.

Amines with more than 8 carbon atoms are often too demanding to be used as effective catalysts.

According to a preferred variant of the invention, the amine is selected from the group consisting of dimethylethanol amine (DMEA), monoethanol amine, diethanol amine, triethanol amine, ethylene diamine (EDA), t-butyl amine, monoethanol amine, diethanol amine, monomethyl amine, dimethyl amine, trimethyl amine, monoethyl amine, diethylamine, triethyl amine, pyridine, pyridine derivative, aniline, aniline derivative, choline, choline derivative, urea, urea derivative, hydrazine derivative, and mixtures thereof.

Particularly preferably, the basic amine catalyst used is ethylene diamine, monoethyl amine, diethyl amine, monomethyl amine, dimethylamine, monoethanol amine, diethanol amine, trimethyl amine, triethyl amine or mixtures thereof.

In case of an acidic catalyst preferably formic acid, acetic acid, propionic acid, oxalic acid, malonic acid, maleic acid, succinic acid, anhydrides of the abovementioned acids and mixtures thereof are used. Very particular preference is given to formic acid, acetic acid or oxalic acid and mixtures thereof.

In one embodiment the method of manufacturing an aluminum pigment according to the present invention has the step of forming a molybdenum coat on the surface of each aluminum particle by stirring a dispersive solution containing aluminum particles and a molybdenum compound.

A method of forming the molybdenum coat on the surface of each aluminum particle is not particularly restricted so far as the dispersive solution containing the aluminum particles and the molybdenum compound can be homogeneously stirred according to this method. More specifically, a method of forming the molybdenum coat on the surface of each aluminum particle by stirring or kneading the dispersive solution containing the aluminum particles and the molybdenum compound in a slurry state or a paste state can be listed.

A stirrer employed in the step of stirring the dispersive solution containing the aluminum particles and the molybdenum compound is not particularly restricted but a well-known stirrer capable of efficiently homogeneously stirring the dispersive solution containing the aluminum particles and the molybdenum compound can be employed. More specifically, a kneader, a kneading machine, a rotating container stirrer, a stirring reactor, a V-type stirrer, a double cone stirrer, a screw mixer, a sigma mixer, a flash mixer, an air current stirrer, a ball mill, an edge runner or the like can be listed.

While the molybdenum compound employed in the present invention is not particularly restricted but a well-known molybdenum compound capable of forming a molybdenum coat when added to the dispersive solution containing the aluminum particles and stirred, peroxidic polymolybdic acid, ammonium molybdate, phosphomolybdic acid or the like can be listed as a specific example. The said molybdenum compound may be solely used, or at least two types of such molybdenum compounds may be mixed with each other.

The peroxidic polymolybdic acid, a compound expressed in the following composition formula (1) in general, can be readily prepared by dissolving metal molybdenum powder or molybdenum oxide in a hydrogen peroxide solution of 5 to 40% in concentration.

A hydrophilic solvent is preferably employed as the solvent for the dispersive solution containing the aluminum particles and the molybdenum compound. More specifically, methyl alcohol, ethyl alcohol, isopropyl alcohol, n-propyl alcohol, t-butyl alcohol, n-butyl alcohol, isobutyl alcohol can be used.

In a preferred embodiment the molybdenum compound, preferably a peroxidic polymolybdic acid, is first prepared separately and then added to the flaky metal pigment used as substrate which is dispersed in a solvent which can be used for the sol-gel process steps.

When forming the silica layer b) preferably the flaky metal effect pigment is first dispersed in a solvent and optionally water. The alkoxysilane, preferably tetraalkoxysilane is added and the addition of the catalyst, preferably takes place after dispersing the flaky metal effect pigment in the organic solvent and optionally heating the dispersion to reaction temperature. The water required for the hydrolysis can already be contained in the organic solvent or added at a later time.

Organic base is then typically introduced as a basic catalyst into the reaction mixture, which contains metal effect pigments, alkoxysilanes, preferably tetraalkoxy silanes and optionally water, in order to start the second stage of the process according to the invention.

The silica layer can also be formed by an acid catalyzed process or first an acid catalyzation followed by a base catalyzed sol-gel process as described in EP 2510060 A1. As acids typically formic acid, acetic acid, propionic acid, oxalic acid, malonic acid or maleic acid or the like can be used. In another embodiment, when first forming layer a) from a molybdenum-oxide the acidic medium imparted by a reagent such as e.g. peroxo molybdic acid is used as catalyzing medium for at least a first step of silica formation by sol-gel process.

When forming the hybrid layer c) the different speeds of the tetraalkoxy silane forming $SiO_2$ and the diphenyl silane in sol-gel reactions need to be considered. Usually, the diphenyl silane is of slower speed and therefore it is preferably added first and the desired amount of tetraalkoxy silane is dosed to the reaction mixture at an appropriate velocity in order to essentially compensate the different reaction speeds of the precursor materials.

In the case of the second variant:

a) optionally a discontinuous or a continuous layer of Mo-oxide, c2) a hybrid layer comprising $SiO_2$ modified by a diphenyl silane, a phenyl silane or mixtures thereof, b2) an inorganic metal oxide layer mainly comprising $SiO_2$, d) optionally a further topcoat of organofunctional silanes, titanates, aluminates or zirconates, it is preferred that the coatings c2) and b2) are coated in a two-pot synthesis by isolation of the coated substrate after step c2) from the reaction mixture and redispersing in a solvent before conducting coating step b2) and the optional step d).

Preferred organic solvents are alcohols, glycols, esters, ketones and mixtures of these solvents. Particular preference is given to the use of alcohols or glycols or mixtures thereof, and very particular preference is given to the use of alcohols.

Suitable alcohols are advantageously methanol, ethanol, isopropanol, n-propanol, t-butanol, n-butanol, isobutyl alcohol, pentanol, hexanol or mixtures thereof.

Particular preference is given to using ethanol and/or isopropanol.

As glycol, use is advantageously made of butyl glycol, propyl glycol, ethylene glycol or mixtures thereof.

The present reaction mixture is preferably reacted at a temperature which is in a range from 20° C. to the boiling point of the particular solvent or solvent mixture. Particularly preferably, the reaction temperature is in a range from 50° C. to a temperature which is preferably 5° C. below the boiling point of the respective solvent or solvent mixture. A preferred reaction temperature range is the temperature range ranging from 75° C. to 82° C.

The invention claimed is:

1. A coated flaky metal effect pigment comprising a metal effect flake as substrate, wherein the substrate is selected from aluminum or aluminum alloys and including the following consecutive coating layers:

a) optionally a discontinuous or a continuous layer of Mo-oxide, b1) an inorganic metal oxide layer comprising over 50% $SiO_2$, c1) a hybrid layer comprising $SiO_2$ modified by a diphenyl silane, a phenyl silane or mixtures thereof, or c2) a hybrid layer comprising $SiO_2$ modified by a diphenyl silane, a phenyl silane or mixtures thereof, and b2) an inorganic metal oxide layer comprising over 50% $SiO_2$, wherein the layer c1) or c2) comprises $SiO_2$ modified by a diphenyl silane and the $^{29}Si$ NMR-MAS signal ratio of D-silanes to Q-silanes is in a range of 1.8% to 10.5%.

2. A coated flaky metal effect pigment according to claim 1, wherein the thickness of layer b1) or b2) is a least 15 nm.

3. A coated flaky metal effect pigment according to claim 1, wherein the $^{29}Si$ NMR-MAS signal ratio of T-silanes to Q-silanes is in a range of 0 to 3.0%.

4. A coated flaky metal effect pigment according to claim 1, wherein the hybrid layer c1) or c2) comprises diphenyl dimethoxy silane.

5. A coated flaky metal effect pigment according to claim 1, wherein the metal effect flake is an aluminum flake, which was produced by milling technology.

6. A coated flaky metal effect pigment according to claim 1, wherein the flaky metal effect pigment has a total amount of the sum of $SiO_2$ and of diphenyl silane in layers b1) and c1) or b2) and c2) of at least 95 wt.-%, based on the amount of the total coating.

7. A coated flaky metal effect pigment according to claim 1, further comprising a further top-coat of organofunctional silanes, titanates, aluminates or zirconates.

8. A coating composition comprising a coated flaky metal effect pigment according to claim 1 and a carrier.

9. A coated flaky metal effect pigment comprising a metal effect flake as substrate, wherein the substrate is selected from aluminum or aluminum alloys and including the following consecutive coating layers:

a) optionally a discontinuous or a continuous layer of Mo-oxide, b1) an inorganic metal oxide layer comprising over 50% $SiO_2$, c1) a hybrid layer comprising $SiO_2$ modified by a diphenyl silane, a phenyl silane or mixtures thereof, or c2) a hybrid layer comprising $SiO_2$ modified by a diphenyl silane, a phenyl silane or mixtures thereof, and b2) an inorganic metal oxide layer comprising over 50% $SiO_2$, wherein the characterization with $^{13}C$-NMR-MAS spectroscopy yields signals attributable to diphenyl moieties of the D-silanes and optionally $^{13}C$-NMR-MAS signals attributable to organic moieties connected with T-silanes and wherein the total amount of these $^{13}C$-NMR signals is in a range of 80% to 100% of all $^{13}C$-signals observed.

10. A coated flaky metal effect pigment comprising a metal effect flake as substrate, wherein the substrate is selected from aluminum or aluminum alloys and including the following consecutive coating layers:

a) optionally a discontinuous or a continuous layer of Mo-oxide, b1) an inorganic metal oxide layer comprising over 50% $SiO_2$, c1) a hybrid layer comprising $SiO_2$ modified by a diphenyl silane, a phenyl silane or mixtures thereof, or c2) a hybrid layer comprising $SiO_2$ modified by a diphenyl silane, a phenyl silane or mixtures thereof, and b2) an inorganic metal oxide layer comprising over 50% $SiO_2$, wherein the total thickness of the coatings a), b) and c) is in a range of 30 to 60 nm.

\* \* \* \* \*